United States Patent
Chen

(10) Patent No.: US 9,974,010 B2
(45) Date of Patent: May 15, 2018

(54) SYSTEM AND METHOD FOR ESTABLISHING NETWORK CONNECTION AND TERMINAL HAVING THE SYSTEM

(71) Applicant: YULONG COMPUTER TELECOMMUNICATION SCIENTIFIC (SHENZHEN) CO., LTD., Shenzhen (CN)

(72) Inventor: Liwei Chen, Shenzhen (CN)

(73) Assignee: Nanchang Coolpad Intelligent Technology Company Limited, Nanchang, Jiangxi Province (CN)

( * ) Notice: Subject to any disclaimer, the term of this patent is extended or adjusted under 35 U.S.C. 154(b) by 0 days. days.

(21) Appl. No.: 15/104,824

(22) PCT Filed: Jan. 23, 2014

(86) PCT No.: PCT/CN2014/071292
§ 371 (c)(1),
(2) Date: Jun. 15, 2016

(87) PCT Pub. No.: WO2015/109506
PCT Pub. Date: Jul. 30, 2015

(65) Prior Publication Data
US 2016/0323813 A1 Nov. 3, 2016

(51) Int. Cl.
*H04B 7/15* (2006.01)
*H04B 17/00* (2015.01)
(Continued)

(52) U.S. Cl.
CPC ....... *H04W 48/18* (2013.01); *H04W 36/0022* (2013.01); *H04W 76/025* (2013.01)

(58) Field of Classification Search
CPC ... H04W 76/04; H04W 84/16; H04W 84/105; H04W 4/16; H04W 88/06; H04W 16/14; H04W 48/18; H04W 15/14
(Continued)

(56) References Cited

U.S. PATENT DOCUMENTS 5,127,042 A * 6/1992 Gillig ............... H04W 84/16
455/11.1
5,239,571 A * 8/1993 Takahashi ......... H04M 1/72505
455/564

(Continued)

FOREIGN PATENT DOCUMENTS

CN 102404815 A 4/2012
CN 103281757 A 9/2013
(Continued)

OTHER PUBLICATIONS

International Search Report dated Oct. 27, 2014 for PCT/CN2014/071292, 5 pages.

*Primary Examiner* — William D Cumming
(74) *Attorney, Agent, or Firm* — Thomas J. Engellenner; Reza Mollaaghababa; Pepper Hamilton LLP

(57) ABSTRACT

Provided is a communication system applied to a terminal, the communication system includes: a first communication module; a second communication module; a first determination unit configured to determine whether the terminal currently supports circuit switched fallback based on a real-time state of the terminal; and a processing unit configured to establish a connection between the first communication module and a first network in a case that the first determination unit determines that the terminal currently supports the circuit switched fallback, or establish a connection between the second communication module and a second network in a case that the first determination unit determines that the terminal does not currently support the
(Continued)

circuit switched fallback. Accordingly, further provided are a terminal and a communication method.

12 Claims, 4 Drawing Sheets

(51) Int. Cl.
    *H04B 1/40*     (2015.01)
    *H04M 3/42*     (2006.01)
    *H04W 4/00*     (2009.01)
    *H04W 24/00*     (2009.01)
    *H04B 1/38*     (2015.01)
    *H04W 48/18*     (2009.01)
    *H04W 36/00*     (2009.01)
    *H04W 76/02*     (2009.01)

(58) Field of Classification Search
    USPC .......... 455/11.1, 67.16, 75, 417, 426.1, 434, 455/435.2, 456.1, 459, 464, 564
    See application file for complete search history.

(56) References Cited

U.S. PATENT DOCUMENTS

| | | | | |
|---|---|---|---|---|
| 5,260,988 A * | 11/1993 | Schellinger | ......... | H04W 84/105 455/464 |
| 5,295,179 A * | 3/1994 | Asahara | ................ | H04W 76/04 455/459 |
| 5,329,574 A * | 7/1994 | Nielson | ................. | H04W 76/04 455/435.2 |
| 5,504,803 A * | 4/1996 | Yamada | ................ | H04W 48/18 455/426.1 |
| 5,673,308 A * | 9/1997 | Akhavan | ................ | H04W 4/16 455/417 |
| 5,894,592 A * | 4/1999 | Brueske | ............... | H03C 3/0941 332/127 |
| 6,885,869 B2 * | 4/2005 | Raith | .................... | H04M 1/725 455/456.1 |
| 7,209,753 B2 * | 4/2007 | Raith | ...................... | G01S 19/34 455/434 |
| 7,242,910 B2 * | 7/2007 | Peterson, III | ......... | H03J 1/0075 455/75 |
| 7,809,381 B2 * | 10/2010 | Aborn | ............... | H04M 3/42246 370/331 |
| 8,064,840 B2 * | 11/2011 | McHenry | .............. | H04W 16/14 455/67.16 |
| 8,644,506 B2 * | 2/2014 | Zellner | .................... | H04L 41/12 380/249 |

FOREIGN PATENT DOCUMENTS

| | | |
|---|---|---|
| CN | 103533499 A | 1/2014 |
| WO | 2010051873 A1 | 5/2010 |

\* cited by examiner

SYSTEM AND METHOD FOR ESTABLISHING NETWORK CONNECTION AND TERMINAL HAVING THE SYSTEM

The present application is a National Stage application of PCT international application PCT/CN2014/071292 filed on Jan. 23, 2014, the entire of which is incorporated herein by reference.

FIELD

The present disclosure relates to the field of terminal technology, and particularly to a communication system, a terminal and a communication method.

BACKGROUND

A multi-mode single-standby phone can support multiple network communications such as LTE, TD, WCDMA, GSM. However, the multi-mode single-standby phone can operate at only one network standard at the same time and CSFB (Circuit Switched Fallback) is supported. In a case that a network of the multi-mode single-standby phone is selected according to default priority, the 4G network is preferential, and the network of the multi-mode single-standby phone will reside in the 4G network.

There is a problem in the conventional technology that, a busy line is prompted for an incoming call in a case that the network of the multi-mode single-standby phone resides in the 4G network in an area where the CSFB is not supported, which results in missing the incoming call.

Therefore, a new technical solution is required, to prevent a user from missing the incoming call in the area where the CSFB is not supported.

SUMMARY

Based on the problem described above, a new technical solution is provided in the present disclosure, to prevent a user from missing an incoming call in an area where the CSFB is not supported.

In view of this, it is provided a communication system applied to a terminal according to the present disclosure, the communication system includes: a first communication module; a second communication module; a first determination unit configured to determine whether the terminal currently supports circuit switched fallback based on a real-time state of the terminal; and a processing unit configured to establish a connection between the first communication module and a first network in a case that the first determination unit determines that the terminal currently supports the circuit switched fallback, or establish a connection between the second communication module and a second network in a case that the first determination unit determines that the terminal does not currently support the circuit switched fallback.

In the technical solution, the first communication module supports only a data service, and the second communication module supports at least a voice service. The connection between the second communication module and the second network is established in a case that the terminal does not support the circuit switched fallback, or the connection between the first communication module and the first network is established in a case that the terminal supports the circuit switched fallback. In this way, network of the terminal resides in the second network in which the voice service can be performed in a case that the terminal does not support the circuit switched fallback, to guarantee the priority of the voice service, thereby preventing a user from missing an incoming call.

Specifically, the first network may be the 4G network, and the second network may be the 2G/3G network. A terminal selects to reside in the 4G network preferably in general. In a case that the network of the terminal resides in the 4G network and the terminal does not support the circuit switched fallback, after the terminal receives a voice service, the terminal can not process the received voice service, and a busy line is prompted, which results in the user missing an incoming call. In the present disclosure, the network of the terminal resides in a network such as the 2G/3G network which supports the voice service in a case that it is detected that the terminal does not support the circuit switched fallback, thereby preventing a user from missing an incoming call and improving usage experience of the user.

In the technical solution described above, preferably, the communication system further includes: a second determination unit configured to detect current network setting of the terminal, and determine whether the current network setting is to preferably establish the connection between the first communication module and the first network; and a control unit configured to control the first determination unit to determine whether the terminal currently supports the circuit switched fallback based on the real-time state of the terminal in a case that the second determination unit determines that the current network setting is to preferably establish the connection between the first communication module and the first network.

In the technical solution, in a case that the current network setting is not to preferably select the first network (for example, the 4G network), and for example is to preferably select the second network (for example, the 2G/3G network), the terminal can continue residing in the second network, and it is not required to determine whether the terminal supports the circuit switched fallback. In a case that the terminal preferably selects the first network, it is determined whether the terminal supports the circuit switched fallback. In this way, different operations are performed depending on different situations of the terminal, to avoid a waste of resources.

In the technical solution described above, preferably, the real-time state includes a network registration state of the terminal and a real-time operation state of the terminal.

In the technical solution, it is determined whether the terminal supports the circuit switched fallback based on the network registration state of the terminal and the operation state of the terminal, for example, whether a network into which the terminal already registers is the first network and/or the second network, and whether the terminal can currently process the voice service and/or the data service. It can be understood by those skilled in the art that a way of determining whether the terminal supports the circuit switched fallback includes but not limited to the way based on the network registration state of the terminal and the way based on the real-time operation state of the terminal described above.

In the technical solution described above, preferably, the first determination unit includes: a result acquisition sub-unit configured to acquire a registration result in a case that the first communication module and the second communication module start registering into the first network and the second network, respectively; and a first determination sub-unit configured to determine that the terminal does not currently support the circuit switched fallback in a case that the registration result indicates that the first communication module succeeds in registering into the first network and the second communication module fails to register into the second network, or determine that the terminal currently supports the circuit switched fallback in a case that the registration result indicates that the first communication module succeeds in registering into the first network and the second communication module succeeds in registering into the second network.

In the technical solution, it is determined whether the terminal supports the circuit switched fallback by determining a united registration result of the terminal. The terminal initiates united registration when the terminal starts up, that is, the terminal starts registering into the first network and the second network simultaneously, for example, the terminal starts registering into the 4G network and the 2G/3G network simultaneously. In a case that the registration result indicates that the terminal succeeds in registering into both the 4G network and the 2G/3G network, it is determined that the terminal supports the circuit switched fallback. In a case that the registration result indicates that the terminal succeeds in registering into only the 4G network, that is, information of EPS only is returned, it is determined that the terminal does not support the circuit switched fallback.

In the technical solution described above, preferably, the first determination unit includes an information determination sub-unit configured to determine whether a tracking area update message received by the terminal includes information in a specified type; and a second determination sub-unit configured to determine that the terminal currently supports the circuit switched fallback in a case that it is determined that the tracking area update message received by the terminal does not include the information in the specified type, or determine that the terminal does not currently support the circuit switched fallback in a case that it is determined that the tracking area update message received by the terminal includes the information in the specified type.

In the technical solution, in a case that the terminal does not initiate the united registration when the terminal starts up and the terminal is already connected to the first network, for example, the 4G network, it is determined whether the tracking area update message returned from the network includes the information in the specified type. Specifically, the information in the specified type includes an Additional update result option. It is determined that the terminal supports the circuit switched fallback in a case that the tracking area update message does not include the Additional update result option or content of the Additional update result option is not 0001. And it is determined that the terminal does not support the circuit switched fallback in a case that the tracking area update message includes the Additional update result option or the content of the Additional update result option is 0001.

In the technical solution described above, preferably, the communication system further includes: a third determination unit configured to determine whether the first communication module and the first network are currently in a connection state in a case that the first determination unit determines that the terminal does not currently support the circuit switched fallback; and a fourth determination unit configured to determine whether the first communication module and the first network currently perform a data service in a case that the third determination unit determines that the first communication module and the first network are currently in the connection state. The processing unit is further configured to prompt a user of the terminal to determine whether to disconnect the connection between the first communication module and the first network and establish the connection between the second communication module and the second network in a case that the fourth determination unit determines that the first communication module and the first network currently perform the data service, or disconnect the connection between the first communication module and the first network and establish the connection between the second communication module and the second network in a case that the fourth determination unit determines that the first communication module and the first network do not currently perform the data service.

In the technical solution, in a case that it is determined that the terminal does not support the circuit switched fallback, it is determined whether the terminal currently processes the data service. In a case that the terminal currently processes the data service, the usage experience of the user is affected in a case that the data service is interrupted and the network of the terminal resides in the second network. Therefore, the user is prompted to select whether to interrupt the data service and whether the network of the terminal resides in the second network in which the voice service can be processed in a case that it is determined that the terminal currently processes the data service, thereby not only ensuring that the data service is not affected, but also ensuring normal running of the voice service, and further improving the usage experience of the user.

In the technical solution described above, preferably, the communication system further includes a function control unit configured to start and/or stop determining whether the terminal currently supports the circuit switched fallback based on the real-time state of the terminal based on a received function-on command and/or a received function-off command.

In the technical solution, the user can select to turn on or turn off a function of voice service preference described above of the present disclosure based on personal needs. In a case that the function of voice service preference is turned on, the terminal resides in the second network in which the voice service can be processed in a case that the terminal does not support the circuit switched fallback. In a case that the function of voice service preference is turned off, an operation described above of the terminal residing in the second network in a case that the terminal does not support the circuit switched fallback is not performed by the terminal, thereby facilitating the user to select different functions depending on different situations and different needs.

According to another aspect of the present disclosure, it is provided a terminal including the communication system according to any one of the technical solutions described above.

According to yet another aspect of the present disclosure, it is provided a communication method including: determining whether a terminal currently supports circuit switched fallback based on a real-time state of the terminal; and establishing a connection between a first communication module and a first network in a case that it is determined that the terminal currently supports the circuit switched fallback, or establishing a connection between a second communication module and a second network in a case that a determination unit determines that the terminal does not currently support the circuit switched fallback.

In the technical solution, the first communication module supports only a data service, and the second communication module supports at least a voice service. The connection between the second communication module and the second network is established in a case that the terminal does not support the circuit switched fallback, or the connection between the first communication module and the first network is established in a case that the terminal supports the circuit switched fallback. In this way, network of the terminal resides in the second network in which the voice service can be performed in a case that the terminal does not support the circuit switched fallback, to guarantee the priority of the voice service, thereby preventing a user from missing an incoming call.

Specifically, the first network may be the 4G network, and the second network may be the 2G/3G network. A terminal selects to reside in the 4G network preferably in general. In a case that the network of the terminal resides in the 4G network and the terminal does not support the circuit switched fallback, after the terminal receives a voice service, the terminal can not process the received voice service, and a busy line is prompted, which results in the user missing an incoming call. In the present disclosure, the network of the terminal resides in a network such as the 2G/3G network which supports the voice service in a case that it is detected that the terminal does not support the circuit switched fallback, thereby preventing a user from missing an incoming call and improving usage experience of the user.

In the technical solution described above, preferably, the communication method further includes: detecting current network setting of the terminal, and determining whether the current network setting is to preferably establish the connection between the first communication module and the first network; and determining whether the terminal currently supports the circuit switched fallback based on the real-time state of the terminal in a case that it is determined that the current network setting is to preferably establish the connection between the first communication module and the first network.

In the technical solution, in a case that the current network setting is not to preferably select the first network (for example, the 4G network), and for example is to preferably select the second network (for example, the 2G/3G network), the terminal can continue residing in the second network, and it is not required to determine whether the terminal supports the circuit switched fallback. In a case that the terminal preferably selects the first network, it is determined whether the terminal supports the circuit switched fallback. In this way, different operations are performed depending on different situations of the terminal, to avoid a waste of resources.

In the technical solution described above, preferably, the real-time state includes a network registration state of the terminal and a real-time operation state of the terminal.

In the technical solution, it is determined whether the terminal supports the circuit switched fallback based on the network registration state of the terminal and the operation state of the terminal, for example, whether a network into which the terminal already registers is the first network and/or the second network, and whether the terminal can currently process the voice service and/or the data service. It can be understood by those skilled in the art that a way of determining whether the terminal supports the circuit switched fallback includes but not limited to the way based on the network registration state of the terminal and the way based on the real-time operation state of the terminal described above.

In the technical solution described above, preferably, the determining whether the terminal currently supports the circuit switched fallback based on the real-time state of the terminal includes: acquiring a registration result in a case that the first communication module and the second communication module start registering into the first network and the second network, respectively; and determining that the terminal does not currently support the circuit switched fallback in a case that the registration result indicates that the first communication module succeeds in registering into the first network and the second communication module fails to register into the second network, or determining that the terminal currently supports the circuit switched fallback in a case that the registration result indicates that the first communication module succeeds in registering into the first network and the second communication module succeeds in registering into the second network.

In the technical solution, it is determined whether the terminal supports the circuit switched fallback by determining a united registration result of the terminal. The terminal initiates united registration when the terminal starts up, that is, the terminal starts registering into the first network and the second network simultaneously, for example, the terminal starts registering into the 4G network and the 2G/3G network simultaneously. In a case that the registration result indicates that the terminal succeeds in registering into both the 4G network and the 2G/3G network, it is determined that the terminal supports the circuit switched fallback. In a case that the registration result indicates that the terminal succeeds in registering into only the 4G network, that is, information of EPS (Evolved Packet System) only is returned, it is determined that the terminal does not support the circuit switched fallback.

In the technical solution described above, preferably, the determining whether the terminal currently supports the circuit switched fallback based on the real-time state of the terminal includes: determining whether a tracking area update message received by the terminal includes information in a specified type; and determining that the terminal currently supports the circuit switched fallback in a case that it is determined that the tracking area update message received by the terminal does not include the information in the specified type, or determining that the terminal does not currently support the circuit switched fallback in a case that it is determined that the tracking area update message received by the terminal includes the information in the specified type.

In the technical solution, in a case that the terminal does not initiate the united registration when the terminal starts up and the terminal is already connected to the first network, for example, the 4G network, it is determined whether the tracking area update message returned from the network includes the information in the specified type. Specifically, the information in the specified type includes an Additional update result option. It is determined that the terminal supports the circuit switched fallback in a case that the tracking area update message does not include the Additional update result option or content of the Additional update result option is not 0001. And it is determined that the terminal does not support the circuit switched fallback in a case that the tracking area update message includes the Additional update result option or the content of the Additional update result option is 0001.

In the technical solution described above, preferably, the communication method further includes: determining whether the first communication module and the first network are currently in a connection state in a case that the terminal does not currently support the circuit switched fallback; determining whether the first communication module and the first network currently perform a data service in a case that the first communication module and the first network are currently in the connection state; and prompting a user of the terminal to determine whether to disconnect the connection between the first communication module and the first network and establish the connection between the second communication module and the second network in a case that the first communication module and the first network currently perform the data service, or disconnecting the connection between the first communication module and the first network and establishing the connection between the second communication module and the second network in a case that the first communication module and the first network do not currently perform the data service.

In the technical solution, in a case that it is determined that the terminal does not support the circuit switched fallback, it is determined whether the terminal currently processes the data service. In a case that the terminal currently processes the data service, the usage experience of the user is affected in a case that the data service is interrupted and the network of the terminal resides in the second network. Therefore, the user is prompted to select whether to interrupt the data service and whether the network of the terminal resides in the second network in which the voice service can be processed in a case that it is determined that the terminal currently processes the data service, thereby not only ensuring that the data service is not affected, but also ensuring normal running of the voice service, and further improving the usage experience of the user.

In the technical solution described above, preferably, the communication method further includes starting and/or stopping determining whether the terminal currently supports the circuit switched fallback based on the real-time state of the terminal based on a received function-on command and/or a received function-off command.

In the technical solution, the user can select to turn on or turn off a function of voice service preference described above of the present disclosure based on personal needs. In a case that the function of voice service preference is turned on, the terminal resides in the second network in which the voice service can be processed in a case that the terminal does not support the circuit switched fallback. In a case that the function of voice service preference is turned off, an operation described above of the terminal residing in the second network in a case that the terminal does not support the circuit switched fallback is not performed by the terminal, thereby facilitating the user to select different functions depending on different situations and different needs.

According to an embodiment of the present disclosure, it is further provided a program product stored in a non-volatile machine-readable medium. The program product is applied to terminal communication and includes a machine-executable instruction for causing a computer system to: determine whether a terminal currently supports circuit switched fallback based on a real-time state of the terminal; and establish a connection between a first communication module and a first network in a case that it is determined that the terminal currently supports the circuit switched fallback, or establish a connection between a second communication module and a second network in a case that a determination unit determines that the terminal does not currently support the circuit switched fallback.

According to an embodiment of the present disclosure, it is further provided a non-volatile machine-readable medium in which a program product applied to terminal communication is stored. The program product includes a machine-executable instruction for causing a computer system to: determine whether a terminal currently supports circuit switched fallback based on a real-time state of the terminal; and establish a connection between a first communication module and a first network in a case that it is determined that the terminal currently supports the circuit switched fallback, or establish a connection between a second communication module and a second network in a case that a determination unit determines that the terminal does not currently support the circuit switched fallback.

According to an embodiment of the present disclosure, it is further provided a machine-readable program for causing a machine to execute the communication method according to any one of the technical solutions described above.

According to an embodiment of the present disclosure, it is further provided a storage medium in which a machine-readable program is stored. Specifically, the machine-readable program causes a machine to execute the communication method according to any one of the technical solutions described above.

In the technical solutions above, the network of the terminal resides in the second network in which the voice service can be performed in a case that the terminal does not support the circuit switched fallback, to guarantee the priority of the voice service, thereby preventing the user from missing an incoming call.

DETAILED DESCRIPTION OF THE EMBODIMENTS

The present disclosure is described in detail below in conjunction with drawings and the embodiments, so that the objectives, features and advantages of the present disclosure described above can be understood more clearly. It should be illustrated that the embodiments of the present disclosure and the features of the embodiments can be combined with each other without conflicting with each other.

Specific details are described below to fully understand the present disclosure, however, the present disclosure can also implemented in other way different from the way described here. Therefore, the protection scope of the present disclosure is not limited to the embodiments disclosed below.

Figure 1:
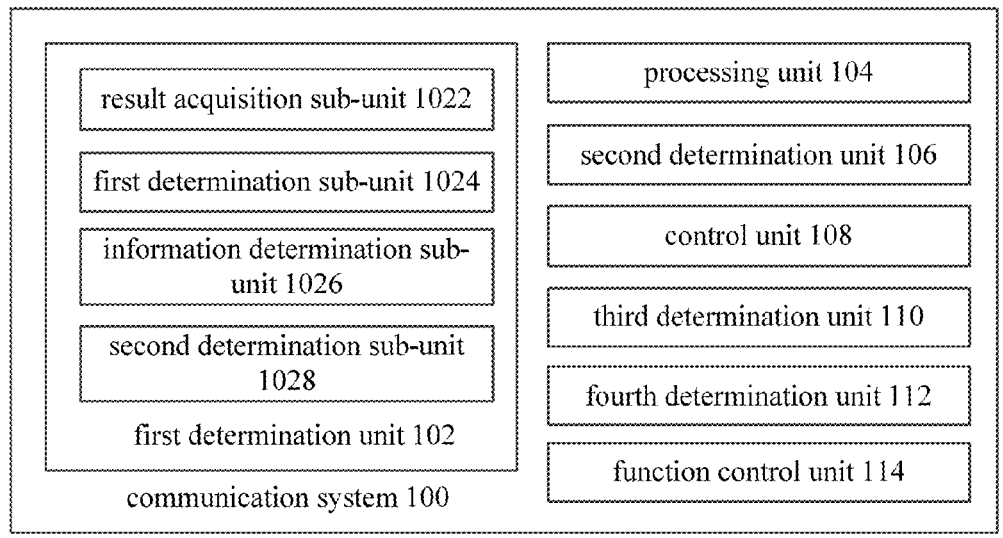
FIG. 1 is a block diagram of a communication system according to an embodiment of the present disclosure.

FIG. 1 is a block diagram of a communication system according to an embodiment of the present disclosure.

As shown in FIG. 1, the communication system 100 according to the embodiment of the present disclosure is applied to a terminal and the communication system 100 includes: a first communication module; a second communication module; a first determination unit 102 configured to determine whether the terminal currently supports circuit switched fallback based on a real-time state of the terminal; and a processing unit 104 configured to establish a connection between the first communication module and a first network in a case that the first determination unit 102 determines that the terminal currently supports the circuit switched fallback, or establish a connection between the second communication module and a second network in a case that the first determination unit 102 determines that the terminal does not currently support the circuit switched fallback.

In the technical solution, the first communication module supports only a data service, and the second communication module supports at least a voice service. The connection between the second communication module and the second network is established in a case that the terminal does not support the circuit switched fallback, or the connection between the first communication module and the first network is established in a case that the terminal supports the circuit switched fallback. In this way, network of the terminal resides in the second network in which the voice service can be performed in a case that the terminal does not support the circuit switched fallback, to guarantee the priority of the voice service, thereby preventing a user from missing an incoming call.

Specifically, the first network may be the 4G network, and the second network may be the 2G/3G network. A terminal selects to reside in the 4G network preferably in general. In a case that the network of the terminal resides in the 4G network and the terminal does not support the circuit switched fallback, after the terminal receives a voice service, the terminal can not process the received voice service, and a busy line is prompted, which results in the user missing an incoming call. In the present disclosure, the network of the terminal resides in a network such as the 2G/3G network which supports the voice service in a case that it is detected that the terminal does not support the circuit switched fallback, thereby preventing a user from missing an incoming call and improving usage experience of the user.

In the technical solution described above, preferably, the communication system further includes: a second determination unit 106 configured to detect current network setting of the terminal, and determine whether the current network setting is to preferably establish the connection between the first communication module and the first network; and a control unit 108 configured to control the first determination unit 102 to determine whether the terminal currently supports the circuit switched fallback based on the real-time state of the terminal in a case that the second determination unit 106 determines that the current network setting is to preferably establish the connection between the first communication module and the first network.

In the technical solution, in a case that the current network setting is not to preferably select the first network (for example, the 4G network), and for example is to preferably select the second network (for example, the 2G/3G network), the terminal can continue residing in the second network, and it is not required to determine whether the terminal supports the circuit switched fallback. In a case that the terminal preferably selects the first network, it is determined whether the terminal supports the circuit switched fallback. In this way, different operations are performed depending on different situations of the terminal, to avoid a waste of resources.

In the technical solution described above, preferably, the real-time state includes a network registration state of the terminal and a real-time operation state of the terminal.

In the technical solution, it is determined whether the terminal supports the circuit switched fallback based on the network registration state of the terminal and the operation state of the terminal, for example, whether a network into which the terminal already registers is the first network and/or the second network, and whether the terminal can currently process the voice service and/or the data service. It can be understood by those skilled in the art that a way of determining whether the terminal supports the circuit switched fallback includes but not limited to the way based on the network registration state of the terminal and the way based on the real-time operation state of the terminal described above.

In the technical solution described above, preferably, the first determination unit 102 includes: a result acquisition sub-unit 1022 configured to acquire a registration result in a case that the first communication module and the second communication module start registering into the first network and the second network, respectively; and a first determination sub-unit 1024 configured to determine that the terminal does not currently support the circuit switched fallback in a case that the registration result indicates that the first communication module succeeds in registering into the first network and the second communication module fails to register into the second network, or determine that the terminal currently supports the circuit switched fallback in a case that the registration result indicates that the first communication module succeeds in registering into the first network and the second communication module succeeds in registering into the second network.

In the technical solution, it is determined whether the terminal supports the circuit switched fallback by determining a united registration result of the terminal. The terminal initiates united registration when the terminal starts up, that is, the terminal starts registering into the first network and the second network simultaneously, for example, the terminal starts registering into the 4G network and the 2G/3G network simultaneously. In a case that the registration result indicates that the terminal succeeds in registering into both the 4G network and the 2G/3G network, it is determined that the terminal supports the circuit switched fallback. In a case that the registration result indicates that the terminal succeeds in registering into only the 4G network, that is, information of EPS only is returned, it is determined that the terminal does not support the circuit switched fallback.

In the technical solution described above, preferably, the first determination unit 102 includes an information determination sub-unit 1026 configured to determine whether a tracking area update message received by the terminal includes information in a specified type; and a second determination sub-unit 1028 configured to determine that the terminal currently supports the circuit switched fallback in a case that it is determined that the tracking area update message received by the terminal does not include the information in the specified type, or determine that the terminal does not currently support the circuit switched fallback in a case that it is determined that the tracking area update message received by the terminal includes the information in the specified type.

In the technical solution, in a case that the terminal does not initiate the united registration when the terminal starts up and the terminal is already connected to the first network, for example, the 4G network, it is determined whether the tracking area update message returned from the network includes the information in the specified type. Specifically, the information in the specified type includes an Additional update result option. It is determined that the terminal supports the circuit switched fallback in a case that the tracking area update message does not include the Additional update result option or content of the Additional update result option is not 0001. And it is determined that the terminal does not support the circuit switched fallback in a case that the tracking area update message includes the Additional update result option or the content of the Additional update result option is 0001.

In the technical solution described above, preferably, the communication system further includes: a third determination unit 110 configured to determine whether the first communication module and the first network are currently in a connection state in a case that the first determination unit 102 determines that the terminal does not currently support the circuit switched fallback; and a fourth determination unit 112 configured to determine whether the first communication module and the first network currently perform a data service in a case that the third determination unit 110 determines that the first communication module and the first network are currently in the connection state. The processing unit 104 is further configured to prompt a user of the terminal to determine whether to disconnect the connection between the first communication module and the first network and establish the connection between the second communication module and the second network in a case that the fourth determination unit 112 determines that the first communication module and the first network currently perform the data service, or disconnect the connection between the first communication module and the first network and establish the connection between the second communication module and the second network in a case that the fourth determination unit determines that the first communication module and the first network do not currently perform the data service.

In the technical solution, in a case that it is determined that the terminal does not support the circuit switched fallback, it is determined whether the terminal currently processes the data service. In a case that the terminal currently processes the data service, the usage experience of the user is affected in a case that the data service is interrupted and the network of the terminal resides in the second network. Therefore, the user is prompted to select whether to interrupt the data service and whether the network of the terminal resides in the second network in which the voice service can be processed in a case that it is determined that the terminal currently processes the data service, thereby not only ensuring that the data service is not affected, but also ensuring normal running of the voice service, and further improving the usage experience of the user.

In the technical solution described above, preferably, the communication system further includes a function control unit 114 configured to start and/or stop determining whether the terminal currently supports the circuit switched fallback based on the real-time state of the terminal based on a received function-on command and/or a received function-off command.

In the technical solution, the user can select to turn on or turn off a function of voice service preference described above of the present disclosure based on personal needs. In a case that the function of voice service preference is turned on, the terminal resides in the second network in which the voice service can be processed in a case that the terminal does not support the circuit switched fallback. In a case that the function of voice service preference is turned off, an operation described above of the terminal residing in the second network in a case that the terminal does not support the circuit switched fallback is not performed by the terminal, thereby facilitating the user to select different functions depending on different situations and different needs.

Figure 2:
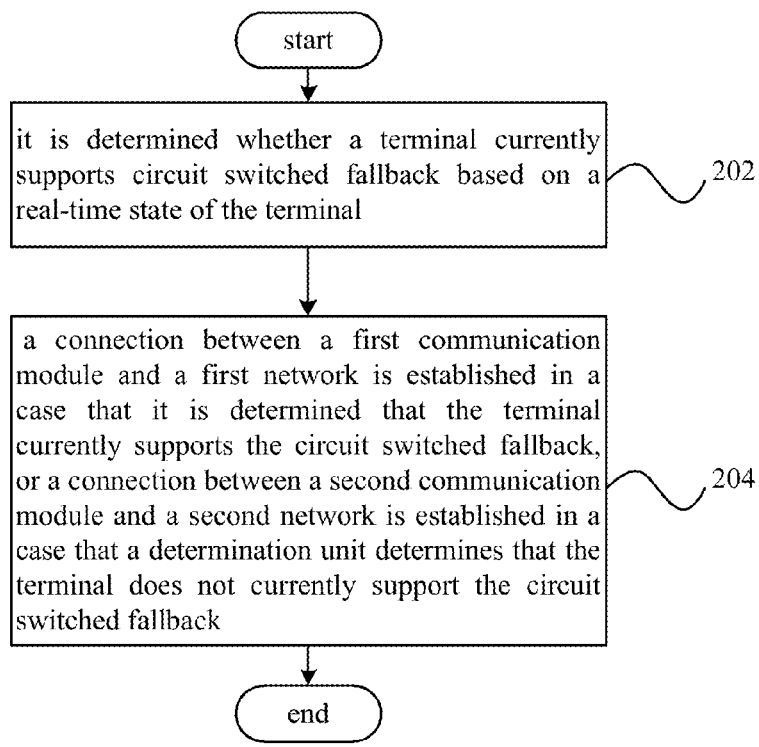
FIG. 2 is a flow diagram of a communication method according to an embodiment of the present disclosure.

FIG. 2 is a flow diagram of a communication method according to an embodiment of the present disclosure.

As shown in FIG. 2, the communication method according to the embodiment of the present disclosure includes step 202 and step 204. In step 202, it is determined whether a terminal currently supports circuit switched fallback based on a real-time state of the terminal. In step 204, a connection between a first communication module and a first network is established in a case that it is determined that the terminal currently supports the circuit switched fallback, or a connection between a second communication module and a second network is established in a case that a determination unit determines that the terminal does not currently support the circuit switched fallback.

In the technical solution, the first communication module supports only a data service, and the second communication module supports at least a voice service. The connection between the second communication module and the second network is established in a case that the terminal does not support the circuit switched fallback, or the connection between the first communication module and the first network is established in a case that the terminal supports the circuit switched fallback. In this way, network of the terminal resides in the second network in which the voice service can be performed in a case that the terminal does not support the circuit switched fallback, to guarantee the priority of the voice service, thereby preventing a user from missing an incoming call.

Specifically, the first network may be the 4G network, and the second network may be the 2G/3G network. A terminal selects to reside in the 4G network preferably in general. In a case that the network of the terminal resides in the 4G network and the terminal does not support the circuit switched fallback, after the terminal receives a voice service, the terminal can not process the received voice service, and a busy line is prompted, which results in the user missing an incoming call. In the present disclosure, the network of the terminal resides in a network such as the 2G/3G network which supports the voice service in a case that it is detected that the terminal does not support the circuit switched fallback, thereby preventing a user from missing an incoming call and improving usage experience of the user.

In the technical solution described above, preferably, the communication method further includes: detecting current network setting of the terminal, and determining whether the current network setting is to preferably establish the connection between the first communication module and the first network; and determining whether the terminal currently supports the circuit switched fallback based on the real-time state of the terminal in a case that it is determined that the current network setting is to preferably establish the connection between the first communication module and the first network.

In the technical solution, in a case that the current network setting is not to preferably select the first network (for example, the 4G network), and for example is to preferably select the second network (for example, the 2G/3G network), the terminal can continue residing in the second network, and it is not required to determine whether the terminal supports the circuit switched fallback. In a case that the terminal preferably selects the first network, it is determined whether the terminal supports the circuit switched fallback. In this way, different operations are performed depending on different situations of the terminal, to avoid a waste of resources.

In the technical solution described above, preferably, the real-time state includes a network registration state of the terminal and a real-time operation state of the terminal.

In the technical solution, it is determined whether the terminal supports the circuit switched fallback based on the network registration state of the terminal and the operation state of the terminal, for example, whether a network into which the terminal already registers is the first network and/or the second network, and whether the terminal can currently process the voice service and/or the data service. It can be understood by those skilled in the art that a way of determining whether the terminal supports the circuit switched fallback includes but not limited to the way based on the network registration state of the terminal and the way based on the real-time operation state of the terminal described above.

In the technical solution described above, preferably, the determining whether the terminal currently supports the circuit switched fallback based on the real-time state of the terminal includes: acquiring a registration result in a case that the first communication module and the second communication module start registering into the first network and the second network, respectively; and determining that the terminal does not currently support the circuit switched fallback in a case that the registration result indicates that the first communication module succeeds in registering into the first network and the second communication module fails to register into the second network, or determining that the terminal currently supports the circuit switched fallback in a case that the registration result indicates that the first communication module succeeds in registering into the first network and the second communication module succeeds in registering into the second network.

In the technical solution, it is determined whether the terminal supports the circuit switched fallback by determining a united registration result of the terminal. The terminal initiates united registration when the terminal starts up, that is, the terminal starts registering into the first network and the second network simultaneously, for example, the terminal starts registering into the 4G network and the 2G/3G network simultaneously. In a case that the registration result indicates that the terminal succeeds in registering into both the 4G network and the 2G/3G network, it is determined that the terminal supports the circuit switched fallback. In a case that the registration result indicates that the terminal succeeds in registering into only the 4G network, that is, information of EPS only is returned, it is determined that the terminal does not support the circuit switched fallback.

In the technical solution described above, preferably, the determining whether the terminal currently supports the circuit switched fallback based on the real-time state of the terminal includes: determining whether a tracking area update message received by the terminal includes information in a specified type; and determining that the terminal currently supports the circuit switched fallback in a case that it is determined that the tracking area update message received by the terminal does not include the information in the specified type, or determining that the terminal does not currently support the circuit switched fallback in a case that it is determined that the tracking area update message received by the terminal includes the information in the specified type.

In the technical solution, in a case that the terminal does not initiate the united registration when the terminal starts up and the terminal is already connected to the first network, for example, the 4G network, it is determined whether the tracking area update message returned from the network includes the information in the specified type. Specifically, the information in the specified type includes an Additional update result option. It is determined that the terminal supports the circuit switched fallback in a case that the tracking area update message does not include the Additional update result option or content of the Additional update result option is not 0001. And it is determined that the terminal does not support the circuit switched fallback in a case that the tracking area update message includes the Additional update result option or the content of the Additional update result option is 0001.

In the technical solution described above, preferably, the communication method further includes: determining whether the first communication module and the first network are currently in a connection state in a case that the terminal does not currently supports the circuit switched fallback; determining whether the first communication module and the first network currently perform a data service in a case that the first communication module and the first network are currently in the connection state; and prompting a user of the terminal to determine whether to disconnect the connection between the first communication module and the first network and establish the connection between the second communication module and the second network in a case that the first communication module and the first network currently perform the data service, or disconnecting the connection between the first communication module and the first network and establishing the connection between the second communication module and the second network in a case that the first communication module and the first network do not currently perform the data service.

In the technical solution, in a case that it is determined that the terminal does not support the circuit switched fallback, it is determined whether the terminal currently processes the data service. In a case that the terminal currently processes the data service, the usage experience of the user is affected in a case that the data service is interrupted and the network of the terminal resides in the second network. Therefore, the user is prompted to select whether to interrupt the data service and whether the network of the terminal resides in the second network in which the voice service can be processed in a case that it is determined that the terminal currently processes the data service, thereby not only ensuring that the data service is not affected, but also ensuring normal running of the voice service, and further improving the usage experience of the user.

In the technical solution described above, preferably, the communication method further includes starting and/or stopping determining whether the terminal currently supports the circuit switched fallback based on the real-time state of the terminal based on a received function-on command and/or a received function-off command.

In the technical solution, the user can select to turn on or turn off a function of voice service preference described above of the present disclosure based on personal needs. In a case that the function of voice service preference is turned on, the terminal resides in the second network in which the voice service can be processed in a case that the terminal does not support the circuit switched fallback. In a case that the function of voice service preference is turned off, an operation described above of the terminal residing in the second network in a case that the terminal does not support the circuit switched fallback is not performed by the terminal, thereby facilitating the user to select different functions depending on different situations and different needs.

The technical solutions according to the disclosure are described in detail below by taking a case that the first network is the 4G network and the second network is the 2G/3G network as an example.

Figure 3:
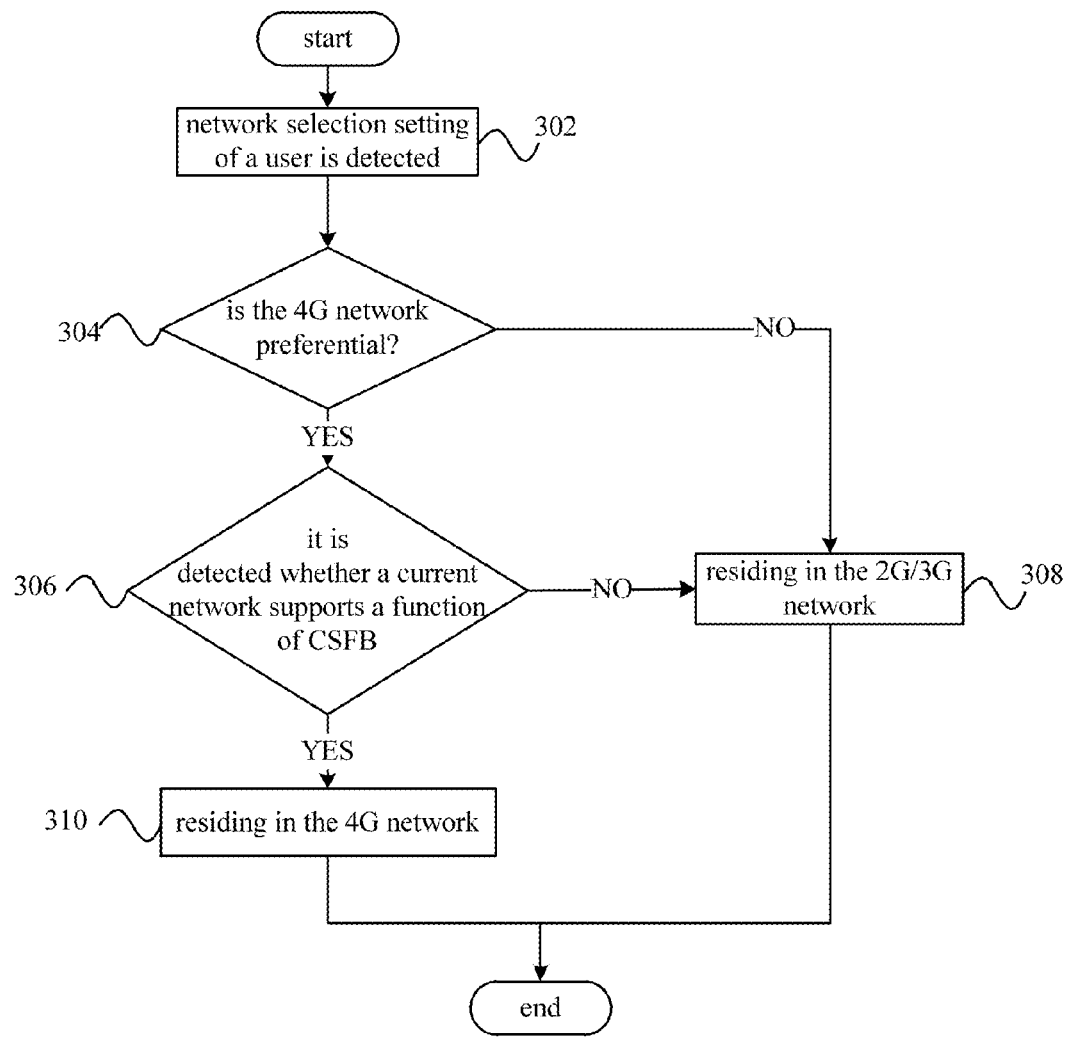
FIG. 3 is a specific flow diagram of a communication method according to an embodiment of the present disclosure.

FIG. 3 is a specific flow diagram of a communication method according to an embodiment of the present disclosure.

As shown in FIG. 3, a flow of the communication method according to the embodiment of the present disclosure includes step 302 to step 310.

In step 302, network selection setting of a user is detected.

In step 304, it is determined whether current network selection setting indicates that the 4G network is preferential.

In step 306, it is detected whether a core network of a terminal supports a function of CSFB in a case that the current network selection setting indicates that the 4G network is preferential. Specifically, there are two methods for determining whether the core network supports the function of CSFB. One of the two methods includes: initiating united registration by the terminal when the terminal starts up, and returning EPS Only in a case that the core network does not support the function of CSFB. And the other of the two methods includes determining whether the core network supports the function of CSFB based on configuration information sent by a cell.

In step 308, the terminal resides in the 2G/3G network in a case that the current network does not support the function of CSFB or the current network selection setting does not support that the 4G network is preferential.

In step 310, the terminal resides in the 4G network in a case that the current network supports the function of CSFB.

Figure 4:
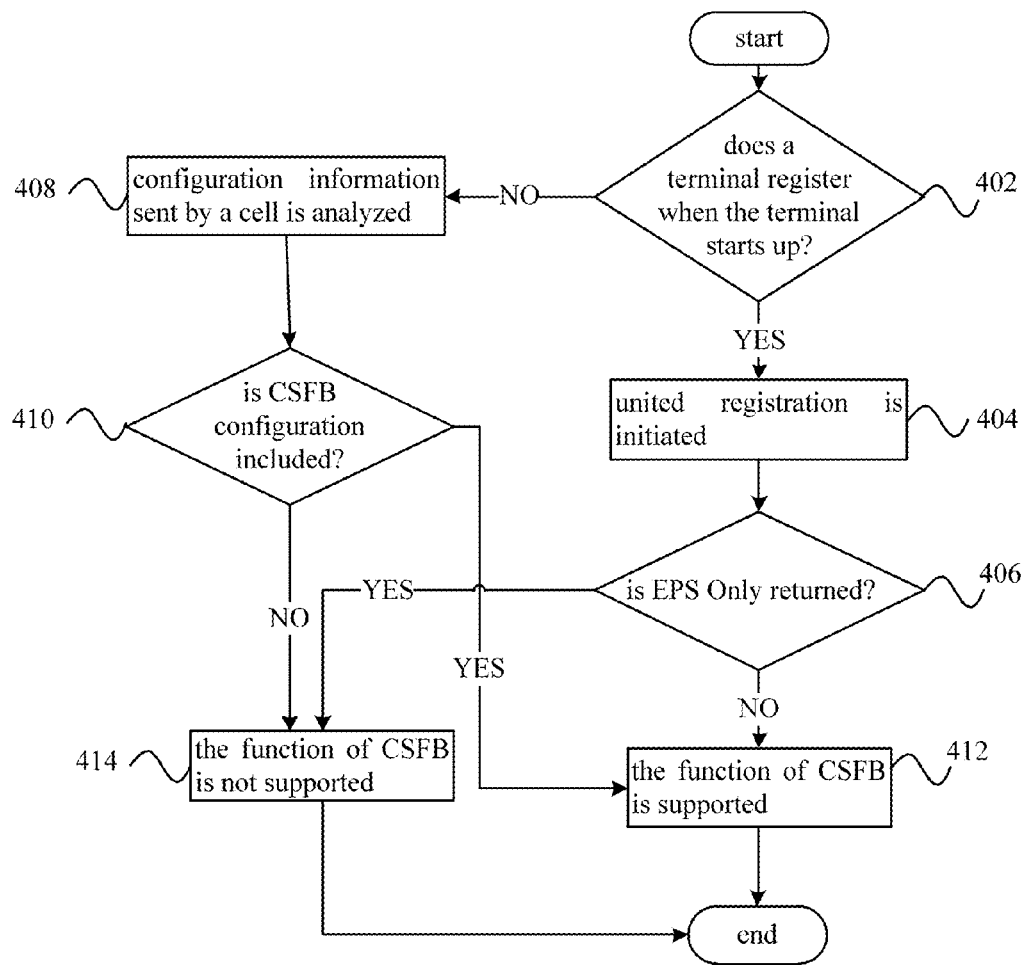
FIG. 4 is a specific flow diagram of determining circuit switched fallback according to an embodiment of the present disclosure.

FIG. 4 is a specific flow diagram of determining circuit switched fallback according to embodiment of the present disclosure.

As shown in FIG. 4, a specific flow of determining circuit switched fallback according to an embodiment of the present disclosure includes step 402 to step 414.

In step 402, it is determined whether a terminal registers when the terminal starts up. And step 404 is proceeded to in a case that it is determined that the terminal registers when the terminal starts up, and step 408 is proceeded to in a case that it is determined that the terminal does not register when the terminal starts up.

In step 404, the terminal initiates united registration. That is, the terminal simultaneously registers into multiple networks, for example, the 2G/3G/4G network.

In step 406, it is determined whether a result of the united registration indicates that the terminal succeeds in registering into only a specified network. For example, the terminal succeeds in registering into only the 4G network, and fails to register into the 2G/3G network. Step 412 is proceeded to in a case that it is determined that the result of the united registration indicates that the terminal succeeds in registering into not only the specified network. And step 414 is proceeded to in a case that it is determined that the result of the united registration indicates that the terminal succeeds in registering into only the specified network.

In step 408, configuration information sent by a cell is analyzed.

In step 410, it is determined whether the configuration information sent by the cell includes CSFB configuration information. A process of determining whether the configuration information sent by the cell includes the CSFB configuration information is described below. A low layer of an UE performs measurement in the 2G/3G network, and reports information on a suitable cell of the 4G network to a high layer of the UE in a case that the low layer of the UE finds the suitable cell of the 4G network. The high layer of the UE determines whether the cell of the 4G network meets a residence condition in conjunction with a reselection parameter configured in a current system message. The UE reselects the cell to which the UE currently access and accesses to the cell of the 4G network in a case that the cell of the 4G network meets the residence condition. Only in a case that the UE resides in the 4G network and initiates a TAU (Tracking Area Update) process, a message of TAU accept (Tracking Area Update accept) returned from the network carries a parameter of whether CSFB is supported. Specifically, in a case that the Additional update result option is not carried in the message of TAU accept returned from the network, or content of the Additional update result option is not 0001, it is determined that the network supports CSFB.

In step 412, it is determined that the function of CSFB is supported.

In step 414, it is determined that the function of CSFB is not supported.

Figure 5:
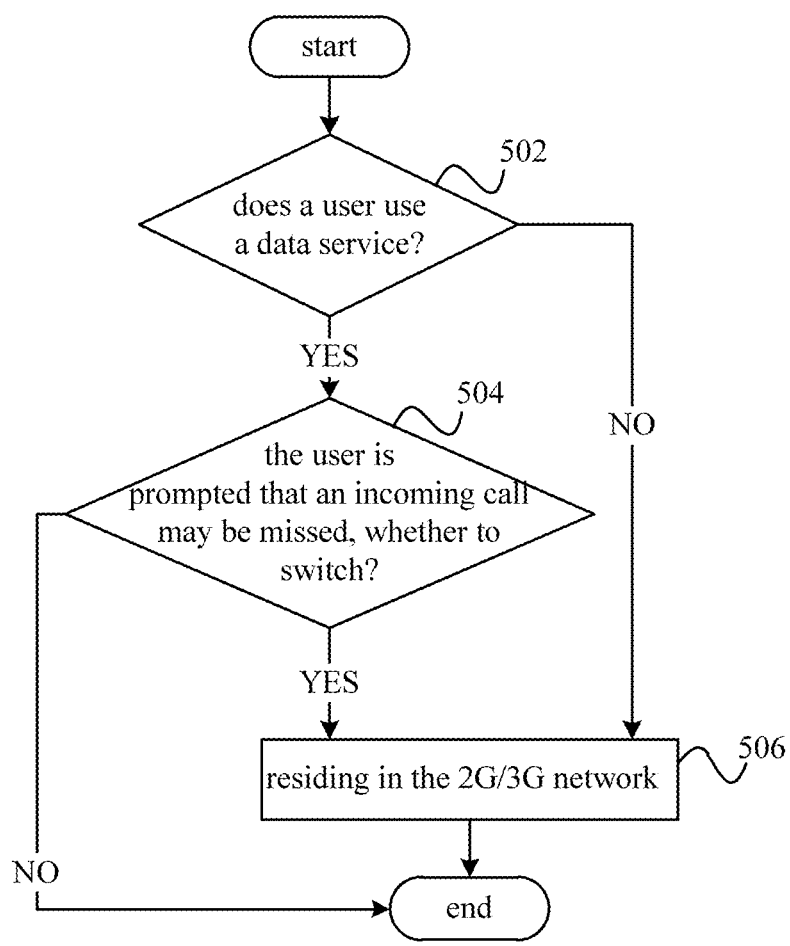
FIG. 5 is a flow diagram of a communication method according to an embodiment of the present disclosure.

FIG. 5 is a flow diagram of a communication method according to an embodiment of the present disclosure.

As shown in FIG. 5, in a case that the terminal moves to an area where CSFB is not supported from an area where CSFB is supported, a processing performed by the terminal includes step 502 to step 506.

In step 502, it is determined whether a user currently uses a data service. Step 504 is proceeded to in a case that it is determined that the user currently uses the data service, and step 506 is proceeded to in a case that it is determined that the user does not currently use the data service.

In step 504, the user is prompted that an incoming call may be missed, and the user is prompted to determine whether to switch the network in which the terminal currently resides.

In step 506, the network of the terminal resides in the 2G/3G network in a case that the user does not currently use the data service or the user selects to switch the network in which the terminal currently resides.

The technical solutions of the present disclosure are described in detail above in conjunction with drawings. In the technical solutions of the present disclosure, in a case that the terminal does not support the circuit switched fallback, the network resides in the second network in which the voice service can be performed, to guarantee the priority of the voice service, thereby prevent the user from missing an incoming call.

According to an embodiment of the present disclosure, it is further provided a program product stored in a non-volatile machine-readable medium. The program product is applied to terminal communication and includes a machine-executable instruction for causing a computer system to: determine whether a terminal currently supports circuit switched fallback based on a real-time state of the terminal; and establish a connection between a first communication module and a first network in a case that it is determined that the terminal currently supports the circuit switched fallback, or establish a connection between a second communication module and a second network in a case that a determination unit determines that the terminal does not currently support the circuit switched fallback.

According to an embodiment of the present disclosure, it is further provided a non-volatile machine-readable medium in which a program product applied to terminal communication is stored. The program product includes a machine-executable instruction for causing a computer system to: determine whether a terminal currently supports circuit switched fallback based on a real-time state of the terminal; and establish a connection between a first communication module and a first network in a case that it is determined that the terminal currently supports the circuit switched fallback, or establish a connection between a second communication module and a second network in a case that a determination unit determines that the terminal does not currently support the circuit switched fallback.

According to an embodiment of the present disclosure, it is further provided a machine-readable program for causing a machine to execute the communication method according to any one of the technical solutions described above.

According to an embodiment of the present disclosure, it is further provided a storage medium in which a machine-readable program is stored. Specifically, the machine-readable program causes a machine to execute the communication method according to any one of the technical solutions described above.

The foregoing embodiments are only preferred embodiments of the present disclosure, and are not intended to limit the present disclosure. Various alterations and changes can be made onto the present disclosure by those skilled in the art. Any modifications, equivalent substitutions or modifications made within the spirit and principle of the present disclosure fall within the protection scope of the present disclosure.

What is claimed is:

1. A communication system applied to a terminal, wherein the communication system comprises:
   a first communication module configured to support a first communication service;
   a second communication module configured to support at least a second communication service;
   a first determination unit configured to determine whether the terminal currently supports circuit switched fallback based on a real-time state of the terminal; and
   a processing unit configured to:
      in an event the first determination unit determines that the terminal currently supports the circuit switched fallback, establish a connection between the first communication module and a first network in which the first communication service is performed; and
      in an event the first determination unit determines that the terminal does not currently support the circuit switched fallback, establish a connection between the second communication module and a second network in which the second communication service is performed; wherein the first communication service comprises a data service and the second communication service comprises a voice service,
   a second determination unit configured to detect current network setting of the terminal, and determine whether the current network setting is to preferably establish the connection between the first communication module and the first network; and
   a control unit configured to control the first determination unit to determine whether the terminal currently supports the circuit switched fallback based on the real-time state of the terminal in a case that the second determination unit determines that the current network setting is to preferably establish the connection between the first communication module and the first network,
   a third determination unit configured to determine whether the first communication module and the first network are currently in a connection state in a case that the first determination unit determines that the terminal does not currently support the circuit switched fallback; and
   a fourth determination unit configured to determine whether the first communication module and the first network currently perform a data service in a case that the third determination unit determines that the first communication module and the first network are currently in the connection state;
   wherein the processing unit is further configured to:
   prompt a user of the terminal to determine whether to disconnect the connection between the first communication module and the first network and establish the connection between the second communication module and the second network in a case that the fourth determination unit determines that the first communication module and the first network currently perform the data service; or
   disconnect the connection between the first communication module and the first network and establish the connection between the second communication module and the second network in a case that the fourth determination unit determines that the first communication module and the first network do not currently perform the data service.

2. The communication system according to claim 1, wherein the real-time state comprises a network registration state of the terminal and a real-time operation state of the terminal.

3. The communication system according to claim 1, wherein the first determination unit comprises:
   a result acquisition sub-unit configured to acquire a registration result in a case that the first communication module and the second communication module start registering into the first network and the second network, respectively; and
   a first determination sub-unit configured to: determine that the terminal does not currently support the circuit switched fallback in a case that the registration result indicates that the first communication module succeeds in registering into the first network and the second communication module fails to register into the second network; or determine that the terminal currently supports the circuit switched fallback in a case that the registration result indicates that the first communication module succeeds in registering into the first network and the second communication module succeeds in registering into the second network.

4. The communication system according to claim 1, wherein the first determination unit comprises:
   an information determination sub-unit configured to determine whether a tracking area update message received by the terminal comprises information in a specified type; and
   a second determination sub-unit configured to: determine that the terminal currently supports the circuit switched fallback in a case that it is determined that the tracking area update message received by the terminal does not comprise the information in the specified type; or determine that the terminal does not currently support the circuit switched fallback in a case that it is determined that the tracking area update message received by the terminal comprises the information in the specified type.

5. The communication system according to claim 1, further comprising:
   a function control unit configured to start and/or stop determining whether the terminal currently supports the circuit switched fallback based on the real-time state of the terminal based on a received function-on command and/or a received function-off command.

6. A terminal comprising a communication system, wherein the communication system comprises:

a first communication module configured to support a first communication service;

a second communication module configured to support at least a second communication service;

a first determination unit configured to determine whether the terminal currently supports circuit switched fallback based on a real-time state of the terminal; and a processing unit configured to:
  in an event the first determination unit determines that the terminal currently supports the circuit switched fallback and establish a connection between the first communication module and a first network in which the first communication service is performed; and
  in an event the first determination unit determines that the terminal does not currently support the circuit switched fallback, establish a connection between the second communication module and a second network in which the second communication service is performed; wherein the first communication service comprises a data service and the second communication service comprises a voice service, a second determination unit configured to detect current network setting of the terminal, and determine whether the current network setting is to preferably establish the connection between the first communication module and the first network; and a control unit configured to control the first determination unit to determine whether the terminal currently supports the circuit switched fallback based on the real-time state of the terminal in a case that the second determination unit determines that the current network setting is to preferably establish the connection between the first communication module and the first network, a third determination unit configured to determine whether the first communication module and the first network are currently in a connection state in a case that the first determination unit determines that the terminal does not currently support the circuit switched fallback; and a fourth determination unit configured to determine whether the first communication module and the first network currently perform a data service in a case that the third determination unit determines that the first communication module and the first network are currently in the connection state;

wherein the processing unit is further configured to:
prompt a user of the terminal to determine whether to disconnect the connection between the first communication module and the first network and establish the connection between the second communication module and the second network in a case that the fourth determination unit determines that the first communication module and the first network currently perform the data service; or
disconnect the connection between the first communication module and the first network and establish the connection between the second communication module and the second network in a case that the fourth determination unit determines that the first communication module and the first network do not currently perform the data service.

7. A communication method, comprising:
determining whether a terminal currently supports circuit switched fallback based on a real-time state of the terminal; and establishing a connection between a first communication module configured to support a first communication service and a first network in which a first communication service is performed in an event it is determined that the terminal currently supports the circuit switched fallback; and establishing a connection between a second communication module configured to support at least a second communication service and a second network in which the second communication service is performed in an event it is determined that the terminal does not currently support the circuit switched fallback wherein the first communication service comprises a data service and the second communication service comprises a voice service, wherein, the method further comprises:
determining whether the first communication module and the first network are currently in a connection state in a case that the terminal does not currently support the circuit switched fallback;

determining whether the first communication module and the first network currently perform a data service in a case that the first communication module and the first network are currently in the connection state; and prompting a user of the terminal to determine whether to disconnect the connection between the first communication module and the first network and establish the connection between the second communication module and the second network in a case that the first communication module and the first network currently perform the data service; or disconnecting the connection between the first communication module and the first network and establishing the connection between the second communication module and the second network in a case that the first communication module and the first network do not currently perform the data service.

8. The communication method according to claim 7, further comprising:
detecting current network setting of the terminal, and determining whether the current network setting is to preferably establish the connection between the first communication module and the first network; and
determining whether the terminal currently supports the circuit switched fallback based on the real-time state of the terminal in a case that it is determined that the current network setting is to preferably establish the connection between the first communication module and the first network.

9. The communication method according to claim 7, wherein the real-time state comprises a network registration state of the terminal and a real-time operation state of the terminal.

10. The communication method according to claim 7, further comprising determining whether the terminal currently supports the circuit switched fallback based on the real-time state of the terminal by:
acquiring a registration result in a case that the first communication module and the second communication module start registering into the first network and the second network, respectively; and
determining that the terminal does not currently support the circuit switched fallback in a case that the registration result indicates that the first communication module succeeds in registering into the first network and the second communication module fails to register into the second network; or determining that the terminal currently supports the circuit switched fallback in a case that the registration result indicates that the first communication module succeeds in registering into the first network and the second communication module succeeds in registering into the second network.

11. The communication method according to claim 7, wherein the determining whether the terminal currently supports the circuit switched fallback based on the real-time state of the terminal comprises:

determining whether a tracking area update message received by the terminal comprises information in a specified type; and determining that the terminal currently supports the circuit switched fallback in a case that it is determined that the tracking area update message received by the terminal does not comprise the information in the specified type, or determining that the terminal does not currently support the circuit switched fallback in a case that it is determined that the tracking area update message received by the terminal comprises the information in the specified type.

12. The communication method according to claim 7, further comprising:

starting and/or stopping determining whether the terminal currently supports the circuit switched fallback based on the real-time state of the terminal based on a received function-on command and/or a received function-off command.

* * * * *